1,569,180

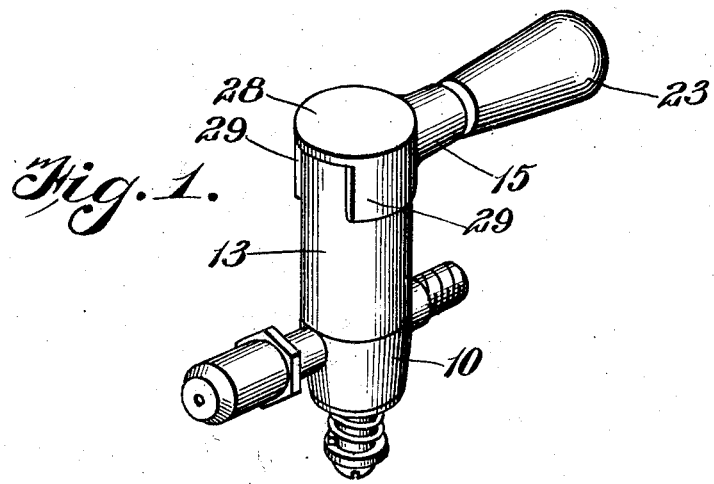
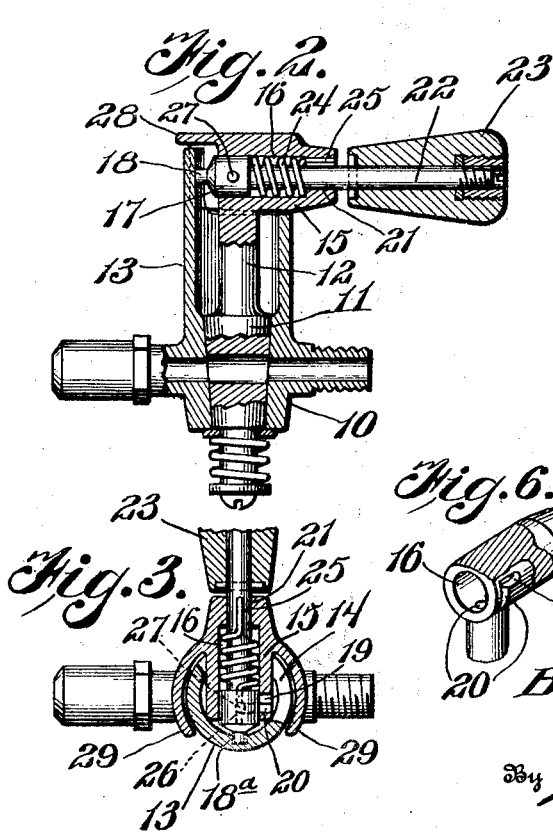
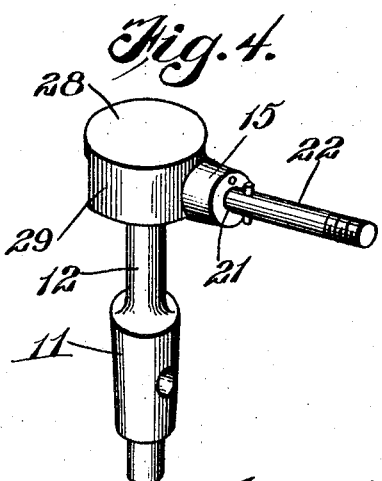
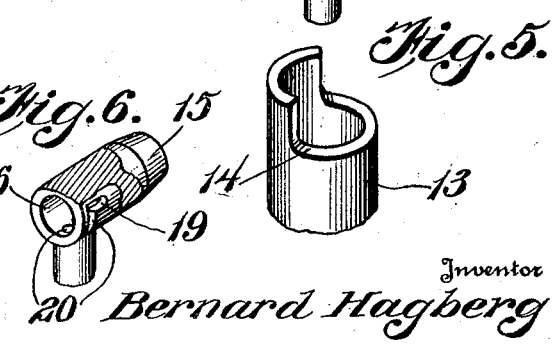
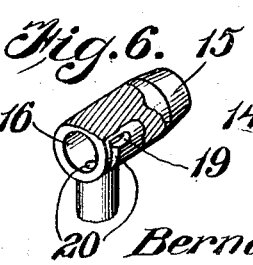
Inventor
Bernard Hagberg
By Watson E. Coleman
Attorney Patented Jan. 12, 1926.

UNITED STATES PATENT OFFICE.

BERNARD HAGBERG, OF MUSKEGON, MICHIGAN.

GAS-COCK LOCK.

Application filed September 3, 1925. Serial No. 54,362.

*To all whom it may concern:*

Be it known that I, BERNARD HAGBERG, a citizen of the United States, residing at Muskegon, in the county of Muskegon and State of Michigan, have invented certain new and useful Improvements in Gas-Cock Locks, of which the following is a specification, reference being had to the accompanying drawings.

This invention relates to gas cock locks and more particularly to a device for locking the gas cock or the like against rotation until a predetermined operation of the handle has been made to thereby prevent operation of the cock by children and by accidental contact.

An important object of the invention is to provide a lock for gas cocks controlled from the handle of the cock and which is only releasable by both rotating and longitudinally shifting a portion of the handle.

A further object of the invention is to provide in a construction of this character a single means resisting both the operations of rotating and longitudinally shifting said portion of the handle.

A still further object of the invention is to provide a device of this character so constructed that it provides an effective dust hood for the cock, preventing collection of dirt and dust about the stem of the cock.

These and other objects I attain by the construction shown in the accompanying drawings, wherein for the purpose of illustration is shown a preferred embodiment of my invention and wherein:—

Figure 1 is a perspective view of a gas cock constructed in accordance with my invention;

Figure 2 is a vertical sectional view therethrough;

Figure 3 is a transverse sectional view taken through the angular portion of the stem of the cock;

Figure 4 is a perspective view of the valve element and its stem removed;

Figure 5 is a perspective of the upper end of the stem housing;

Figure 6 is a perspective view partially broken away of the upper end of the stem and the angular portion thereof forming a housing for the locking plunger.

Referring now more particularly to the drawings, the numeral 10 generally indicates the body of a gas cock, 11 the valve element thereof and 12 the stem for rotating this valve element. In accordance with my invention, I provide the cock body with a tubular extension 13 surrounding the stem 12 and having in its upper end a notch 14 through which an angular projection 15 of the stem is directed. The notch is of greater circumferential width than the size of this angular projection so that the angular projection may be rotated to move the valve element 11 from fully opened to fully closed positions.

This angular projection has a bore 16 within which is slidably mounted a plunger 17 having a centrally located tit 18 for engagement in an opening 18ª formed in the inner face of the wall of the tubular extension 13 when the angular projection 15 is so positioned that the valve is fully closed. The wall of the angular projection at the end of the bore is formed with a slot, providing communicating longitudinally and circumferentially extending branches 19 and 20, the longitudinally extending branch being disposed at one end of the circumferentially extending branch 20. The outer end of the projection 15 has a reduced bore 21 communicating with the bore 16 and through this reduced bore projects a stem 22. To the outer end of this stem is secured a handle element 23 which is held against rotation and longitudinal movement with relation to the stem. Between the inner end of the bore 16 of the angular portion 15 and the opposed end of the plunger 17, a compression spring 24 is disposed in surrounding relation to the stem 22. This spring at its ends has longitudinally projecting portions 25 and 26 engaging the end walls of the bore and plunger so that this spring serves to constantly urge the plunger, stem and handle in a direction to place a pin 27, mounted in the plunger, in the circumferentially extending portion 20 of the slot. This pin may, however, only enter this circumferentially extending portion when the tit 18 is in alignment with the socket 18ª as otherwise the plunger cannot project sufficiently.

It will be seen that with the tit in engagement with the socket, it is impossible to place the valve in open position until the handle portion 23 is first rotated to move the pin 27 into alignment with the longitudinally extending slot 19 and then shifted longitudinally to move the pin into this slot. It will also be seen that the spring 24 resists both of these movements and when the tit is returned to alignment with the socket, will automatically cause both engagement of the tit in the socket and the engagement of the pin 27 in the slot 20. In order to prevent collection of dirt, dust and the like about the stem 12 and within the tubular extension 13, the angular extension 15 of the stem is provided with a disk-like head portion 28 slidably abutting the upper end of the tubular extension 13. This head portion, if desired, may have short flanges 29 projecting downwardly therefrom at opposite sides of the angular portion 15 to cover the ends of the notch 14 as they are exposed by swinging movement of the angular portion.

The structure of the device is obviously capable of a certain range of change and modification without departing from the spirit of the invention and I accordingly do not limit myself to the specific structure hereinbefore set forth except as hereinafter claimed.

I claim:—

1. In combination with a gas cock including the usual valve element and stem therefor and casing, an angular extension upon the stem having a bore, a housing for the stem carried by the body of the valve and having portions opposing the angular portion of the stem throughout the movement of the stem, a plunger mounted in the bore of the angular portion of the stem, a handle element for shifting the plunger to partially rotate or to longitudinally move the same, a tit on the plunger and a socket in the opposed portion of the stem housing, single means constantly urging the tit on the plunger in a direction to engage the stem housing and to rotate the plunger and means preventing rotation of the plunger until the tit is engaged in the socket of the stem housing and then permitting limited rotation thereof.

2. In combination with a gas cock including the usual valve element and stem therefor and casing, an angular extension upon the stem having a bore, a housing for the stem carried by the body of the valve and having portions opposing the angular portion of the stem throughout the movement of the stem, a plunger mounted in the bore of the angular portion of the stem, a handle element for shifting the plunger to partially rotate or to longitudinally move the same, a tit on the plunger and a socket in the opposed portion of the stem housing, single means constantly urging the tit on the plunger in a direction to engage the stem housing and to rotate the plunger, means preventing rotation of the plunger until the tit is engaged in the socket of the stem housing and then permitting limited rotation thereof said means preventing longitudinal movement of the plunger to withdraw the tit from the socket until the plunger has been partially rotated.

In testimony whereof I hereunto affix my signature.

BERNARD HAGBERG.